United States Patent
Marze

[15] 3,684,784
[45] Aug. 15, 1972

[54] QUATERNARY NITROGEN-CONTAINING RANDOM COPOLYMERS

[72] Inventor: Xavier Marze, Lyon, France
[73] Assignee: Rhone-Poulenc S.A., Paris, France
[22] Filed: Oct. 9, 1970
[21] Appl. No.: 79,696

[30] Foreign Application Priority Data

Oct. 15, 1969   France..................6935303

[52] U.S. Cl..........260/80.3 N, 204/180 P, 260/2 BP, 260/2.1 E, 260/80.73, 260/87.3, 260/88.1 PE, 260/88.1 PN, 260/897 A, 260/DIG. 18
[51] Int. Cl.......C08f 15/02, C08f 15/40, C08f 27/08
[58] Field of Search.......260/79.3 R, 80.73, 88.1 PN, 260/2 BP, 87.3, 89.7 N, 80.3 H, 91.3 VA

[56] References Cited

UNITED STATES PATENTS

| | | | |
|---|---|---|---|
| 2,676,166 | 4/1954 | Webers | 260/85.7 |
| 2,808,349 | 10/1957 | Melamed | 117/139.5 |
| 2,829,053 | 4/1958 | Weaver | 96/114 |
| 3,170,901 | 2/1965 | Melamed | 260/89.7 N |

OTHER PUBLICATIONS

Selegny, E. et al., Bull. Soc. Chim., 1966, pg. 2400.

Primary Examiner—Joseph L. Schofer
Assistant Examiner—C. A. Henderson, Jr.
Attorney—Cushman, Darby & Cushman

[57] ABSTRACT

New compositions of matter which are nitrogen-containing random copolymers which comprise recurring units of formulas

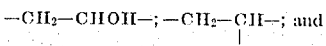
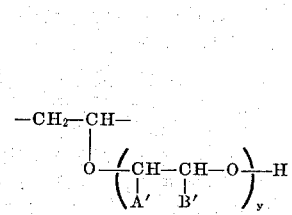

alone, or in combination with one or more of the recurring units of formulas:

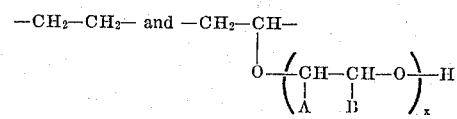
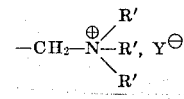

the relative proportions of the recurring units in the copolymers being, respectively, $n$ and $q$ and if present, $m$, $p$ and $r$, such that the ratio $n:m+p+q+r$ is between 1 and 60, in which R represents hydrogen or aliphatic, alicyclic, aromatic or araliphatic radical;

A and B are different, one representing a hydrogen atom and the other a radical of the formula:

$$-CH_2-\overset{\oplus}{N}\diagup\begin{matrix}R'\\-R',\\ \diagdown R'\end{matrix} Y^{\ominus}$$

wherein $Y^{\ominus}$ is an anion, and each R', which may be the same or different, represents a hydrocarbon radical, which may be substituted;

A' and B' are different, one representing a hydrogen atom and the other a radical of the formula $-CH_2X$, wherein X represents a halogen atom, are described for use in ion-exchange membranes and also for improving the anti-static and dyeability properties of synthetic polymers.

7 Claims, No Drawings

QUATERNARY NITROGEN-CONTAINING RANDOM COPOLYMERS

The present invention relates to nitrogen-containing random copolymers and to various applications of these copolymers.

It is known [Y. Merle, J. Rech. CNRS 11 91–115 (1960)] to prepare amine-containing polymers derived from polyhydroxy polymers, such as polyvinyl alcohol, by reacting these polymers with an epoxyamine such as 1,2-epoxy-3-diethylamino-propane, which can be obtained by the action of diethylamine on epichlorhydrin [E. Reboul, C.R. Acd. Sci. 1883 p. 1556–8]. These amine polymers contain recurring units of the formula:

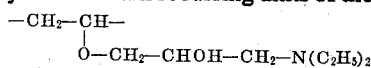

or

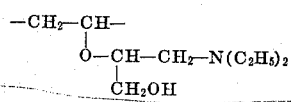

These amine polymers have been used to form ion exchange membranes (Y. Merle, loc. cit., p.101). However, they do not behave satisfactorily owing to excessive swelling and their bad mechanical behavior (E. Selegny et al., Bull. Soc. Chim. Fr. 1966 p. 2400, 1st column, penultimate paragraph; Y. Merle, loc. cit., p.101).

The present invention relates to other nitrogen-containing polymers which give rise to ion exchange membranes having good mechanical properties.

According to the present invention, there are provided nitrogen-containing random copolymers which comprise recurring units of the formula:

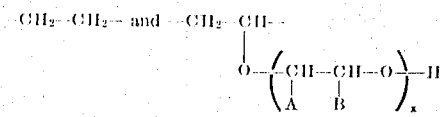

alone, or in combination with one or more of the recurring units of formulas:

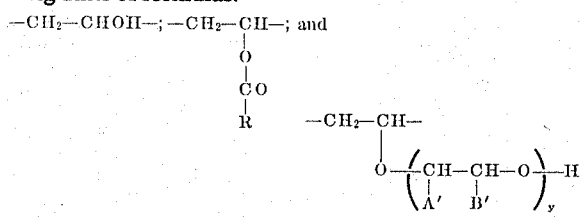

the relative proportions of the recurring units in the copolymers being, respectively, $n$ and $q$ and, if present, $m$ $p$ and $r$ such that the ratio $(n)/(m+p+q+r)$ may be between 1 and 60, preferably between 4.5 and 18, in which R represents hydrogen or an aliphatic, alicyclic, aromatic or araliphatic radical;

A and B are different, one representing a hydrogen atom and the other a radical of the formula:

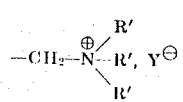

wherein $Y^-$ is an anion and R', which may be the same or different, represents a hydrocarbon radical which may be substituted, preferably a methyl radical;

A' and B' are different, one representing a hydrogen atom and the other a radical of the formula — $CH_2X$ wherein X represents a halogen atom, preferably chlorine.

Since the formula (I) represents an average of the actual recurring units forming the copolymers according to this invention, it follows that the numbers $n$, $m$, $p$, $q$, $r$, $x$ and $y$ need not necessarily be integers.

$Y^-$ represents an anion which can be exchanged by the application of conventional ion-exchange methods such as chloride, bromide, nitrate, sulphate, sulphite, phosphate and sulphonate ions.

The copolymers of this invention are advantageously prepared by reacting an epihalohydrin with ethylene/vinyl alcohol binary copolymers or ethylene/vinyl alcohol/vinyl ester ternary copolymers, and then reacting the resulting halogen atoms in the copolymer with a tertiary amine so as to introduce quaternary nitrogen atoms. In such a process, copolymers are obtained in which the anion $Y^-$ is a halide ion corresponding to the epihalohydrin used. For convenience, the general expression "ethylene/alcohol copolymer" will be used hereafter to denote either the binary copolymers or the ternary copolymers, and the expression "intermediate halogenated copolymer" will denote the copolymer formed by the reaction of the epihalohydrin with the ethylene/alcohol copolymer.

The ethylene/alcohol copolymers used in the process of the invention may be prepared by any known method; generally, they are obtained by partial or total saponification of an ethylene/vinyl ester copolymer.

The ethylene/vinyl ester copolymers usually employed have a molar ratio (ethylene/vinyl ester) of between 1 and 60, preferably between 4.5 and 18, so that in the final copolymer $$1 \leq \frac{n}{m+p+q+r} \leq 60, \text{ preferably } 4.5 \leq \frac{n}{m+p+q+r}$$

(18)

The nature of the vinyl ester forming part of the ethylene/vinyl ester copolymer employed in the saponification is not critical. Suitable vinyl esters include those of aliphatic carboxylic acids of one to 18 carbon atoms, for example one to four and 14 to 18 carbon atoms, including halogen substituted acids and cyclic acids, aromatic carboxylic acids and unsaturated aliphatic acids such as the formate, acetate, propionate, butyrate, stearate, benzoate, cyclohexanoate, isobutyrate, palmitate, myristate, toluate, naphthoate, campholate, acrylate and chloracetate. However, it is generally preferred to use the acetate, owing to its ready availability and cost.

The saponification of the ethylene/vinyl ester copolymer is usually carried out until an ethylene/alcohol copolymer is obtained in which the numerical ratio of the units (hydroxyethylene)/(hydroxyethylene + acyloxyethylene) is greater than or equal to 0.7, preferably greater than or equal to 0.95, so that in the final copolymer according to the invention $$\frac{p}{m+p+q+r} \leq 0.3, \text{ preferably } \frac{p}{m+p+q+r} \leq 0.0.5$$

The ethylene/alcohol copolymers used are preferably such that, when subjected to complete acetylation, they have a fusion index (also called melt index, measured according to conditions E of the ASTM D 1238–62 T Standard) of below 500, preferably between 1 and 200.

The epihalohydrins which can be used in the process of this invention are epichlorhydrin, epibromhydrin, and epiiodohydrin, but it is generally preferred to use epichlorhydrin, which is a more common product.

The reaction of the epihalohydrin with the ethylene/alcohol copolymers is advantageously performed in a solvent for the ethylene/alcohol copolymer and in the presence of a Lewis acid or of a compound which can liberate a Lewis acid under the reaction conditions. As solvent, a polar solvent such as an aliphatic or aromatic hydrocarbon is advantageously used. As the Lewis acid, boron trifluoride, tin tetrachloride, aluminum trichloride or titanium tetrachloride is advantageously used and the addition products of Lewis acids with ethers are advantageously used as compounds which can liberate Lewis acids under the reaction conditions.

The amount of catalyst used is generally between 0.01 and 10 percent by weight of the polymer solution, preferably between 1 and 4 percent. The reaction temperature is generally between 20 and 150° C., preferably between 50° and 90° C. The amount of epihalohydrin used during the course of the reaction is generally such that the ratio of this quantity, expressed in mols, to the number of hydroxyl groups present in the polymer is between 0.2 and 5. The reaction is generally continued until the molar ratio of the epihalohydrin which has reacted to the number of hydroxyethylene final copolymer $$0.05 \leq \frac{qx+ry}{m+q+r} \leq 4.$$

The introduction of quaternary ammonium groups in the intermediate halogenated copolymer can be effected according to any known method. In one preferred method, a tertiary amine, such as trimethylamine, is reacted with the intermediate halogenated copolymer by immersing the latter in a solution of trimethylamine; the reaction is advantageously carried out in aqueous or alcoholic solution and at a temperature between 0° and 150° C., preferably between 15° and 90° C.; the concentration of trimethylamine in the solvent is generally greater than 5 percent, preferably near the saturation value; the reaction can also be carried out under atmospheric pressure or at an elevated pressure.

The number of quaternary ammonium groups introduced is generally greater than or equal to 70 percent of the number of halogen atoms present in the intermediate halogenated copolymer, and is preferably greater than or equal to 90 percent of this number such that $$\frac{qx}{qx+ry} \geq 0.7, \text{ and preferably } \frac{qx}{qx+ry} \geq 0.9.$$

The present invention also provides ion exchange membranes comprising a copolymer of the present invention. The preparation of the ion exchange membranes can be carried out employing the process for the preparation of the polymers described above, the shaping of the membrane being carried out before the quaternization stage; this shaping of the membranes can be effected by hot pressing or calendering, or preferably by casting a solution of the intermediate halogenated copolymer. Suitable solvents for this copolymer include cyclic ketones and amines; a a certain proportion of non-solvents, can, in addition, be incorporated into these solvents.

Ion exchange membranes can also be prepared which are reinforced by using a screen, for example by performing the abovementioned casting on a fabric or a grid.

If they are used in the production of ion exchange membranes for the electrodialysis of saline solutions, for example for the desalination of sea water, the copolymers according to the invention are preferably such that:

$$0.2 \leq \frac{qx+ry}{m+q+r} \leq 1.5 \text{ and } \frac{qx}{qx+ry} \geq 0.9$$

The copolymers of this invention can also be used to confer dyeing affinity on synthetic polymers which are unsuitable for dyeing, particularly polyolefines; for this application they are preferably used in an amount of from 1 percent to 30 percent based on the weight of the synthetic polymer; mixing can be effected either mechanically by using the polymers in the pure state, or by using the polymers in solution.

In the same way, and in the same proportions, the copolymers according to this invention can be used as anti-static agents.

The membranes comprising a copolymer of the invention are also useful in the fields of reverse osmosis and ultrafiltration.

The following examples further illustrate the present invention. Various tests and measurements which allow the qualities of the ion exchange membranes to be assessed are indicated below.

a. Electrical substitution resistance: the variation in the electrical resistance of a stream of liquid in a position perpendicular to the axis of the stream when the membrane is substituted for a section of the liquid of the same thickness and of the same surface area as the membrane. This substitution resistance is measured in a 0.6 M aqueous KCl solution, and is expressed in ohm.cm$^2$.

b. Selective permeability: this relates to the ability of the membrane to allow only anions, and not cations, to pass through.

This selective permeability is calculated from the electromotive force E measured between two aqueous KCl solutions of 0.4 M and 0.8M respectively, separated by the membrane in question, which has previously been saturated with a 0.6 M aqueous solution of KCl.

The formula giving the selective permeability, P, in percentage is:

$$\frac{P}{100} = \frac{t^{-+} - t^+}{1 - t^+}$$

in which $t^+$ is the transport number of the Cl$^-$ ion and $t^{-+}$ is the transport number of the same ion in the membrane.

$t^{-+}$ is given by the formula: $t^{-+} = (E + Eo)/(2\ Eo)$ in which $Eo = (RT)/(F) \text{Log } n\ (a_1)/(a_2)$ where
R = the gas constant
T = absolute temperature
F = Faraday's constant (96,489 coulombs per gram equivalent)

$a_1$ = activity of the electrolyte in the more concentrated compartment (calculated from the concentration of the electrolyte and the activity coefficient), and $a_2$ = activity of the electrolyte in the less concentrated compartment.

c. Transfer of water: The quantity of water is measured which has passed across the membrane placed in a cell divided by the membrane into two compartments, with one compartment containing pure water and the other compartment containing a 1.2 M aqueous solution of KCl. This transfer of water is expressed in mm³ per hour, per cm² of membrane and for a difference in concentration of 1 mol/liter between the two solutions.

EXAMPLES 1 to 9

A series of tests is carried out using the particular working conditions and the amounts of reactants indicated in Table (I):

5 g. of ethylene/alcohol copolymer, obtained by the saponification of an ethylene/vinyl acetate copolymer, the degree of saponification being 99 percent, epichlorhydrin, and boron trifluoride etherate, are introduced into a 150 cm³ flask equipped with a reflux condenser and a stirring system. If the initial copolymer is subjected to total acetylation, it displays the melt index indicated in Table (I).

The mixture is heated to 65° C. and kept at this temperature until a clear and homogeneous solution is obtained. This solution is poured onto a horizontal polyester film having a surface area of 216 cm² and the whole is heated at 60° C. for 20 hours. THe polyester film is separated from the film treated with epichlorhydrin. THe latter film is then immersed in an aqueous solution at 23° C. containing 25 percent by weight of trimethylamine. After rinsing in water, anion exchange membranes which are transparent and flexible even in the dry state are obtained. Some characteristics of these membranes and of the copolymers comprising these membranes are indicated in Table (I). In addition, some other properties of the membranes are measured:

A strip 4 mm wide, cut from the membrane of Example 1 is subjected to stretching tests at 23° C. and under a relative humidity of 50 percent; it displays an elongation at break of 350 percent, the tensile breaking strength being 210 kg/cm². Under the same conditions a strip cut from the membrane of Example 5 displays an elongation at break of 260 percent and a tensile breaking strength of 248 kg/cm²; a strip cut from the membrane of Example 6 displays an elongation at break of 280 percent and a tensile breaking strength of 194 kg/cm².

The membrane of Example 5 displays a substitution resistance of 7.5 Ω.cm² and a selective permeability of 86 percent after it has been treated with a normal aqueous solution of potassium hydroxide for 24 hours at 23° C.

TABLE (I)

| Example | 1 | 2 | 3 | 4 | 5 | 6 | 7 | 8 | 9 |
|---|---|---|---|---|---|---|---|---|---|
| Melt index of the completely acetylated ethylene/alcohol copolymer | 25 | 3.5 | 15 | 2 | 2 | 20 | 2.5 | 2.5 | 150 |
| Amount of epichlorhydrin in cm.³ | 1.1 | 1.3 | 1.1 | 1.5 | 1.3 | 1.2 | 1.5 | 1.3 | 1.5 |
| Amount of etherate in cm.³ | 0.1 | 0.1 | 0.1 | 0.1 | 0.1 | 0.1 | 0.1 | 0.1 | 0.1 |
| Duration of introduction of quaternary nitrogen atoms, in hours | 165 | 240 | 165 | 120 | 144 | 164 | 168 | 240 | 120 |
| Substitution resistance in Ω cm.² | 3 | 5 | 7 | 4 | 7 | 6 | 10 | 18 | 11 |
| Selective permeability in percent | 81 | 85 | 87 | 83 | 87 | 84 | 86 | 91 | 87 |
| Transfer of water | 15.8 | | | | 6.24 | 11.3 | | | |
| n/m+p+q+r | 6.2 | 7.9 | 7.9 | 9.2 | 9.2 | 9.2 | 14 | 14 | 14 |
| p/m+p+q+r | 0.01 | 0.01 | 0.01 | 0.01 | 0.01 | 0.01 | 0.01 | 0.01 | 0.01 |
| qx+ry/m+q+r | 0.350 | 0.470 | 0.390 | 0.555 | 0.505 | 0.505 | 0.570 | 0.510 | 0.510 |
| qx/qx+ry | 0.98 | 0.98 | 0.98 | 0.98 | 0.98 | 0.98 | 0.98 | 0.98 | 0.98 |

EXAMPLE 10

40 g. of an ethylene/vinyl alcohol copolymer similar to that employed in Example 4, 15.3 g. of epichlorhydrin, 600 cm³ of xylene, and 0.8 cm³ of BF₃ etherate, are introduced into a 1 l. flask equipped with a stirrer and a reflux condenser. The mixture is heated at 70° C. for 2 hours and cooled, and the intermediate chlorinated copolymer is precipitated by the addition of methanol. 51 g. of chlorinated copolymer are thus obtained. 10 g. of this copolymer are intimately mixed with 90 g. of polypropylene (melt index, equal to 1.1, measured according to ASTM D 1238–57 T Standard under conditions E). Mixing is carried out in a tubular mixer heated to 180° C.; the operation lasts 15 minutes. 3 g. of this mixture are formed into a film of size 20 mm × 20 mm and thickness 0.2 mm, by means of a press heated to 180° C. This film is immersed for 90 hours in an aqueous solution at 23° C. containing 25 percent by weight of trimethylamine.

A film is thus obtained consisting of a mixture of polypropylene and a copolymer according to the invention having the following characteristics:

$n/m+p+q+r = 9.2$     $p/m+p+q+r = 0.01$
$(qx)/(qx+ry) = 0.9$     $(qx+ry)/(m+q+r) = 1.15$

This film is washed with water, dried for 2 hours at 40° C. in vacuo (15 mm of mercury), and then left for 69 hours at 23° C. in a chamber where the prevailing relative humidity is 60 percent. The electrostatic characteristics of the film are then measured in accordance with the technique described in the Example of Addition No. 94,655 to French Pat. 1,572,180. The charge acquired by the film rises to 520 volts and the half-discharge time is 22 seconds.

EXAMPLE 11

Example 10 is repeated but the polypropylene is replaced by polyethylene having a melt index (measured according to ASTM D 1238–52 T Standard, conditions D) equal to 5. The kneading of the polypropylene/copolymer mixture and the pressing to form it into a film are carried out at 145° C.

The characteristics of this film are measured as in Example 10: the charge acquired is 480 volts and the half-discharge time is 2 seconds.

EXAMPLE 12

Example 10 is repeated but the quaternization of the trimethylamine is effected for 181 hours instead of 90 hours. The radio $(q\ x)/(qx + ry)$ characterizing the copolymer according to the invention is then equal to 0.98.

The film obtained is dyed with Lanasyne Blue GL (Color Index No. 61,135) which is an acid dyestuff. The dye bath comprises 0.5 cm³/liter of Sunaptol LT (surface-active agent obtained by the action of ethylene oxide on linseed oil): 2 cm³/liter of pure acetic acid; and 0.6 g./liter of Lanasyne Blue GL.

The bath ratio, which represents the ratio of the weight of film in grams to the volume of the dye bath in cm³, is 1/50, the temperature s 100° C. and the length of treatment is 1 hour. A film having a dark blue color is obtained.

If this film is subjected for 2 hours to the action of boiling methanol or boiling acetone, the blue color remains unchanged.

EXAMPLE 13

A 5 liter flask provided with a reflux condenser and a stirrer is charged with 250 g. of an ethylene/vinyl alcohol copolymer identical to that used in Example 4; 1,350 cm³ of xylene; 75 cm³ of epichlorhyelrin; and 5 cm³ of BF₃ etherate. The mixture is heated at 70° C. for 1 hour, while being shaken. 2,350 cm³ of cyclohexanone are then added and the solution is heated to 75° C. and poured onto 1.3 m² of a polyester fabric weighing 87 g./m² and comprising 27 filaments per centimeter of both warp and weft. The solvents are removed using a current of hot air and the fabric thus coated is then immersed for 4 hours at 70° C., and under pressure, in an aqueous solution containing 25 percent by weight of trimethylamine. The membrane obtained is washed with water, dried, and pressed for 10 minutes at 130° C. under a pressure of 155 bars.

The polymer constituting the membrane has the following characteristics:

$n/m+p+q+r = 9.2$         $p/m+p+q+r = 0.01$
$(qx+ry)/(m+q+r) = 0.555$  $(qx)/(qx+ry) = 0.98$

The membrane itself has a substitution resistance of 12Ω.cm² a selective permeability of 81 percent and a water transmission of 3.53 mm³/hr/cm². For the purpose of measuring the mechanical properties, a piece of the membrane is cut off and used to cover the bottom of a hollow cylinder having an internal diameter of 40 mm, the said bottom being pierced with 7 holes 9 mm in diameter, and the cylinder is then filled with water so that a pressure is applied to the membrane. The membrane only allows leakages to appear when the pressure reaches 20 bars.

We claim:
1. Random copolymers which comprise recurring units of formulas:

$-CH_2-CH_2-$ and $-CH_2-CH-$

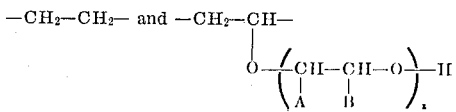

alone, or in combination with one or more of the recurring units of formulas:

$-CH_2-CHOH-$; $-CH_2-CH-$; and

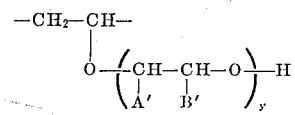

the relative proportions of the recurring units in the copolymers being, respectively, $n$ and $q$ and, if present, $m$, $p$ and $r$ such that the ratio $n{:}m+p+q+r$ is between 1 and 60 and $x$ and $y$ are numbers such that $$0.05 \leq \frac{qx+ry}{m+q+r} \leq 4$$

in which R represents hydrogen or an aliphatic radical of 1 to 17 carbon atoms, halogen substituted aliphatic radical of one to 17 carbon atoms, or a cyclohexyl, phenyl, tolyl or naphthyl radical;

A and B are different, one representing a hydrogen atom and the other a radical of the formula:

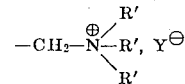

wherein $Y^{\ominus}$ is an anion, and R' represents a methyl radical;

A' and B' are different, one representing a hydrogen atom and the other a radical of the formula — CH₂X, wherein X represents a halogen atom.

2. Copolymers according to claim 1, in which $$\frac{p}{m+p+q+r} \leq 0.3$$

3. Copolymers according to claim 2 in which $$\frac{p}{m+p+q+r} \leq 0.5$$

4. Copolymers according to claim 1, in which $$\frac{qx+ry}{m+q+r} \leq 1.5$$

5. Copolymers according to claim 1, in which the ratio $n{:}m+p+q+r$ is between 4.5 and 18.

6. Copolymers according to claim 1, in which $$\frac{qx}{qx+ry} \geq 0.9$$

7. Copolymers according to claim 1, in which X represents chlorine.

* * * * *

UNITED STATES PATENT OFFICE
CERTIFICATE OF CORRECTION

Patent No. 3,684,784            Dated August 15, 1972

Inventor(s)  Xavier Marze

It is certified that error appears in the above-identified patent and that said Letters Patent are hereby corrected as shown below:

Column 3, line 10, before "polar" insert --non- --

Column 5, line 35, after "copolymer" insert

--together with 60 $cm^3$ of xylene--.

Signed and sealed this 6th day of March 1973.

(SEAL)
Attest:

EDWARD M. FLETCHER, JR.
Attesting Officer

ROBERT GOTTSCHALK
Commissioner of Patents